(12) United States Patent
Xu et al.

(10) Patent No.: US 10,848,056 B1
(45) Date of Patent: Nov. 24, 2020

(54) SYSTEM AND METHOD FOR IMPROVING POWER FACTOR AND THD OF A SWITCHING POWER CONVERTER

(71) Applicant: DIALOG SEMICONDUCTOR INC., Campbell, CA (US)

(72) Inventors: Naidong Xu, Campbell, CA (US); Laiqing Ping, Campbell, CA (US); Nan Shi, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 16/544,789

(22) Filed: Aug. 19, 2019

(51) Int. Cl.
| | |
|---|---|
| H02M 1/42 | (2007.01) |
| H02M 7/06 | (2006.01) |
| H02M 1/44 | (2007.01) |
| H02M 3/156 | (2006.01) |
| H02M 1/00 | (2006.01) |

(52) U.S. Cl.
CPC .......... *H02M 1/4225* (2013.01); *H02M 1/44* (2013.01); *H02M 3/156* (2013.01); *H02M 7/06* (2013.01); *H02M 2001/0009* (2013.01)

(58) Field of Classification Search
CPC ................. H02M 1/42; H02M 1/4208; H02M 2001/0032; H02M 2001/0035; H02M 1/12; H02M 7/2176; H02M 3/156
See application file for complete search history.

(56) References Cited

U.S. PATENT DOCUMENTS

| | | | | |
|---|---|---|---|---|
| 6,903,536 | B2* | 6/2005 | Yang .................... | H02M 1/4225 323/266 |
| 7,436,685 | B2* | 10/2008 | Li ........................ | H02M 1/4225 363/21.01 |
| 8,085,563 | B2* | 12/2011 | Gaboury ............. | H02M 1/4225 323/222 |

* cited by examiner

*Primary Examiner* — Thienvu V Tran
*Assistant Examiner* — Nusrat Quddus
(74) *Attorney, Agent, or Firm* — Haynes and Boone, LLP

(57) ABSTRACT

A system for improving a power factor (PF) of a power converter in signal communication with a rectifier and an electromagnetic interference capacitor is disclosed. The system includes a controller and a threshold detector. The threshold detector is configured to measure and compare a rectified voltage against a threshold voltage and the controller is configured to set the power converter to a stop-mode. The power converter is set to the stop-mode at a stop-time that is less than a first zero-crossing time. The controller is further configured to set the power converter to a run-mode at a time that is past the first zero-crossing time.

20 Claims, 13 Drawing Sheets

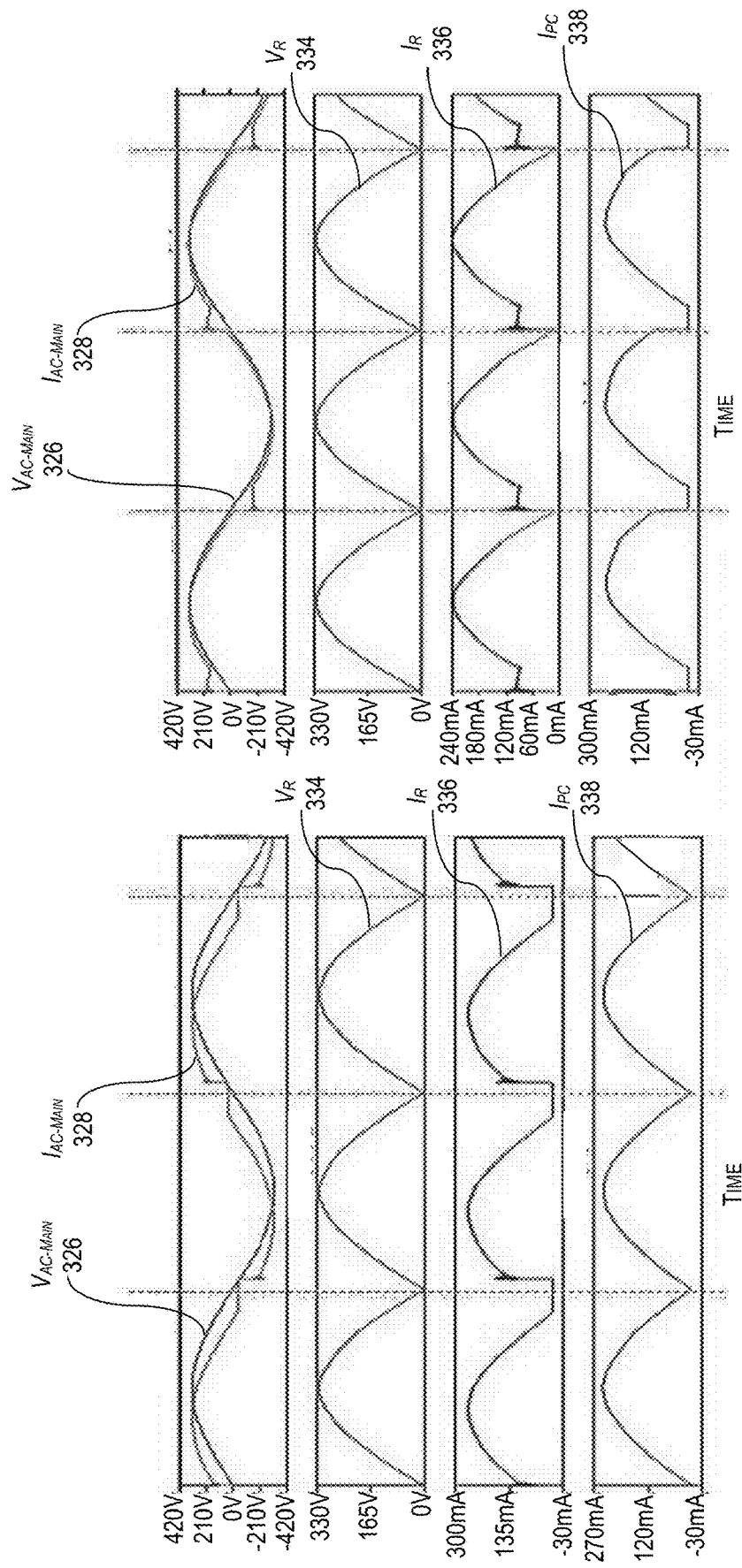

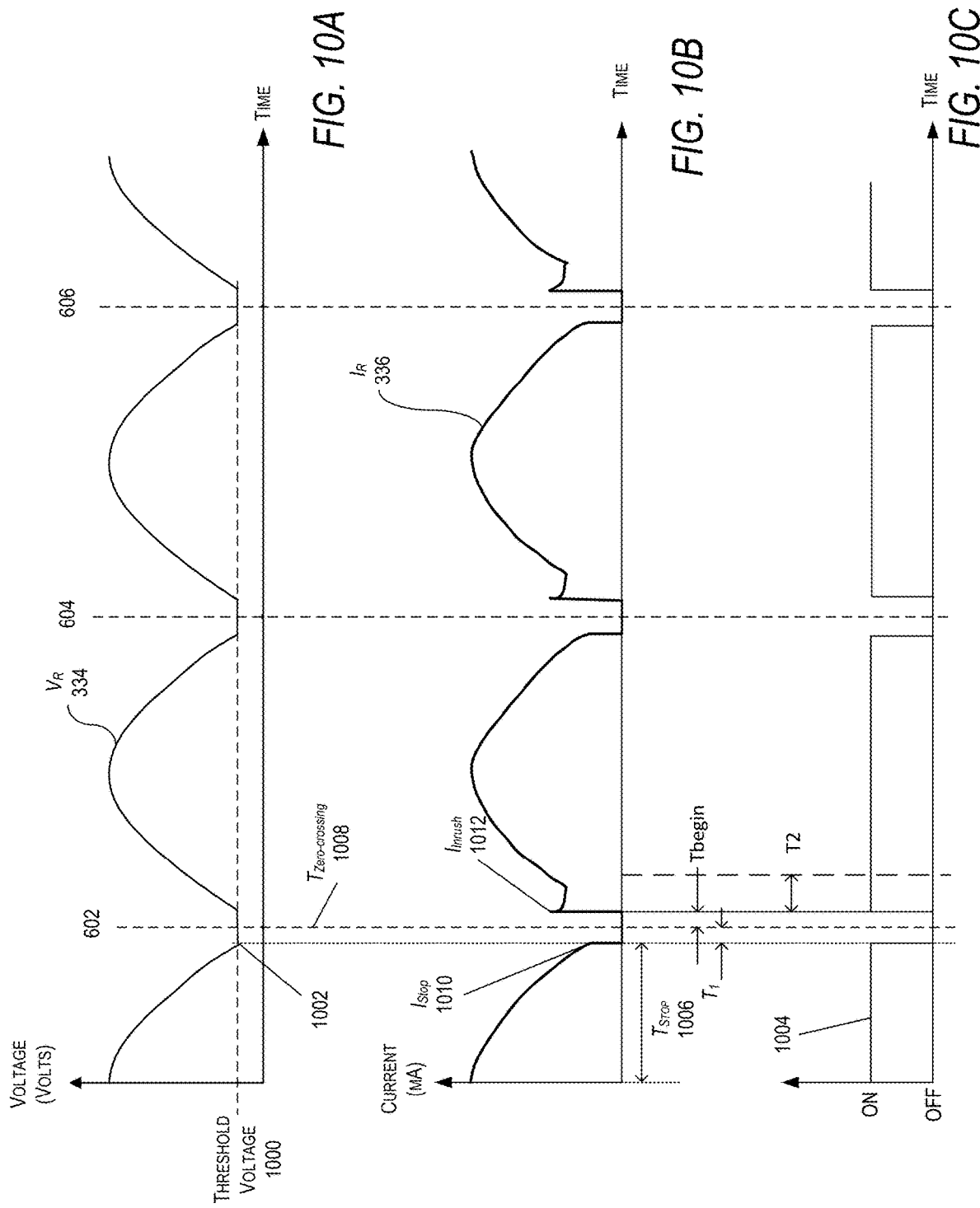

US 10,848,056 B1

SYSTEM AND METHOD FOR IMPROVING POWER FACTOR AND THD OF A SWITCHING POWER CONVERTER

TECHNICAL FIELD

This application relates to switching power converters, and more particularly to a switching power converter with improved total harmonic distortion (THD) and power factor (PF).

BACKGROUND

At present, single-stage alternating current to direct current (AC-DC) power conversion is a low cost and thus popular power supply topology for applications such as solid-state lighting. An important parameter for a single-stage AC-DC power switching converter (SPSC) is its power factor (PF), which is the ratio of the real power delivered by the AC main to the SPSC as compared to the apparent power delivered to the SPSC. The apparent power is insensitive to the phasing between the input current and voltage delivered to the SPSC in contrast to the delivered real power. As such, the power factor is lowered if the input current and voltage delivered to the SPSC are out of phase.

In general, an SPSC is electrically connected to the AC main via a rectifier that may be, for example, a diode bridge rectifier. The AC main is the AC line power provided by a power supplier such as, for example, a power utility company. The AC main will have an AC voltage that cycles from zero volts to a positive and negative peak line voltages that may be, for example, ±120 volts times 1.414 (for approximately ±170 volts) in the United States (U.S.) with a cycle frequency of, for example, 60 Hertz in the U.S.

In FIG. 1A, an illustration of an AC main voltage signal ($V_{AC-Main}$) 100 is shown as a plot of voltage 102 versus time 104. The $V_{AC-Main}$ 100 is shown as sinusoidal having a positive peak line voltage ($V_{Main-Peak}$) 106, a negative peak line voltage ($-V_{Main-Peak}$) 108, and a plurality of zero-crossings 110A, 110B, 110C, 110D, 110E, 110F, and 110G, where the voltage of the $V_{AC-Main}$ 100 is zero volts 112 at the plurality of zero-crossings 110A, 110B, 110C, 110D, 110E, 110F, and 110G. The cycle frequency of the $V_{AC-Main}$ 100 has a first period $T_{P1}$ 113. In FIG. 1B, an illustration of the rectified AC main voltage signal ($V_{AC-Rect}$) 114 is shown as a plot of the voltage 102 versus time 104. In this example, it is appreciated that the $V_{AC-Rect}$ 114 tracks the $V_{AC-Main}$ 100 and has a second period $T_{P2}$ 115 that is half of $T_{P1}$ 113 because the $V_{AC-Rect}$ 114 has twice the cycle frequency as the $V_{AC-Main}$ 100. As such, the $V_{AC-Rect}$ 114 has corresponding zero volts 112 values at the zero-crossings 110A, 110B, 110C, 110D, 110E, 110F, and 110G of the $V_{AC-Main}$ 100. The $V_{AC-Rect}$ 114 also has the same positive peak line voltage 106 as the $V_{AC-Main}$ 100.

In FIG. 2, a system block diagram of an example of a SPSC 200 connected to the $V_{AC-Main}$ 100 through a rectifier 202 is shown. The rectifier 202 receives the $V_{AC-Main}$ 100 across an input capacitor ($C_X$) 204 and rectifies $V_{AC-Main}$ 100 to produce the $V_{AC-Rect}$ 114 that is passed to the SPSC 200 through a parallel electromagnetic interference (EMI) capacitor ($C_{EMI}$) 206. The SPSC 200 then produces and drives an output load 208 with an output DC voltage ($V_{Out}$) 210.

In this example, it is commonly known that the $C_X$ 204 capacitor between the AC line and neutral as well as the $C_{EMI}$ 206 capacitor between a rectified input voltage voltage bus 212 and ground 214 after the rectifier 202 are needed to pass electro-magnetic interference compliance. Unfortunately, the capacitors $C_X$ 204 and $C_{EMI}$ 206 add additional currents to the system in addition to the switching power converter input current (Inc) 216 of the SPSC 200. These capacitor currents 218 and 220 are charge/discharge currents of the capacitors $C_X$ 204 and $C_{EMI}$ 206 that introduce distortions to a rectified input current 222 from the rectifier 202 that lower the power factor and/or the total harmonic distortion (THD).

Generally, these distortions increase under light load conditions, where the SPSC 200 contribution to the total rectified input current 222 is smaller relative to the currents 218 and 220 utilized to charge and discharge the capacitors $C_X$ 204 and $C_{EMI}$ 206. These distortions are further increased at high input voltage and light load conditions, where the capacitor currents 218 and 229 are at a maximum and the switching power converter input current 216 is reduced.

As such there is a need for a system and method that addresses this problem and improves the PF and THD of the SPSC 200.

SUMMARY

A system for improving a power factor (PF) of a switching power converter in signal communication with a rectifier and an electromagnetic interference (EMI) capacitor ($C_{EMI}$) is disclosed. In this example, the rectifier is electrically connected in parallel with the ($C_{EMI}$) and an input X capacitor ($C_X$) and is configured to receive an alternating current (AC) mains voltage ($V_{AC-Main}$) across the $C_X$ and produce a rectified voltage across the $C_{EMI}$ that produces an input current to the switching power converter. The $V_{AC-Main}$ has a plurality of zero-crossings at a plurality of zero-crossing times. The system includes a controller in signal communication with the switching power converter and a threshold detector in signal communication with the controller, switching power converter, and the $C_{EMI}$. The threshold detector is configured to measure and compare the rectified voltage against a threshold voltage and the controller is configured to set the switching power converter to a stop-mode that stops the switching power converter from switching its power switch transistor in a regular mode of operation if the rectified voltage is dropping in a voltage magnitude and is below the threshold voltage. The switching power converter is set to the stop-mode at a stop-time that is less than a first zero-crossing time of the plurality of zero-crossing times. The controller is further configured to set the switching power converter to a run-mode that enables the switching power converter to resume cycling the power switch transistor in the regular mode of operation at a time that is past the first zero-crossing time.

Each cycle of the rectified input voltage extends from a corresponding first zero-crossing time of the AC mains input voltage to a corresponding subsequent zero-crossing time. The subsequent zero-crossing time for a first cycle of the rectified input voltage is the first zero-crossing time for a second cycle of the rectified input voltage, and so on. In each cycle of the rectified input voltage, the rectified input voltage has a positive sinusoidal profile that reaches a peak at a midpoint of the cycle.

Since the rectified input voltage has a positive sinusoidal profile during each cycle, the rectified input current should have the same positive sinusoidal profile to boost the power factor. During periods of heavy load, the input current to the switching power converter dominates the rectified input current such that the controller can boost the power factor by modulating the cycling of the power switch transistor so that the input current to the switch power converter has a positive sinusoidal profile over each cycle of the rectified input voltage. But such power factor correction does not work during periods of relatively low-load (e.g., 25% of the maximum load or less). As the load lessens, the input current to the switching power converter also lessens. But the current for the charging and discharging of the X capacitor and the EMI capacitor does not diminish. The EMI capacitor current thus becomes an appreciable portion of the rectified input current during low-load operation.

To compensate for the EMI capacitor current, it is thus conventional for a controller to modify the sinusoidal shaping of the input current to the switching power converter so that the profile of the input current is proportional to a delayed and phase-shifted version of the rectified input voltage. Although the power factor is thus improved by this modification, the total harmonic distortion is not. To improve the total harmonic distortion while still enjoying an improved power factor, the switching of the power switch transistor is modulated so that the input current to the switching power converter is shaped to be proportional to the delayed and phase-shifted version of the rectified input voltage in a conventional fashion. The switching of the power switch transistor during this current shaping is denoted herein as a "regular mode of operation" for the switching power converter. To improve the THD, the regular mode of operation is ceased in each cycle of the rectified input voltage when the rectified input voltage has peaked and is falling below a threshold voltage prior to the zero-crossing time at the end of the cycle. In contrast, it was conventional for the regular mode of operation to continue until the end of each cycle.

With regard to a zero-crossing time that separate two adjacent cycles, the zero-crossing time marks the end of a first cycle and marks the beginning of the second cycle. During the first cycle the input voltage to the switching power converter will reach a peak and then begin to fall until it reaches the threshold voltage, whereupon the regular mode of operation ceases. The regular mode of operation will not begin at the zero-crossing at the end of the first cycle because of current shaping responsive to a delayed version of the rectified input voltage. A lull in the regular mode of operation will thus occur about each zero-crossing time between adjacent cycles. During this lull period, the switching power converter controller may cease the cycling of the power switch transistor. Alternatively, the controller may continue to cycle the power switch transistor but this low-power cycling during the lull period is not responsive to the rectified input voltage as it would be during the regular mode of operation. For example, the controller may cycle the power switch transistor during the lull period with a fixed on-time or until a fixed peak current is reached. The fixed peak current or the fixed on-time would have no relationship to the rectified input voltage. The resulting lull period is quite advantageous as the power factor remains high but the THD is substantially reduced.

The threshold voltage may be set by an external resistor in some embodiments. Alternatively, the threshold voltage may be set through the programming of a one-time-programmable memory such as a fuse memory within the switching power converter controller.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE DRAWINGS

The invention may be better understood by referring to the following figures. The components in the figures are not necessarily to scale, emphasis instead being placed upon illustrating the principles of the invention. In the figures, like reference numerals designate corresponding parts throughout the different views.

FIG. 7 is an expanded view of the first plot of the AC main voltage signal and the second plot of the AC mains input current in accordance the present disclosure.

FIG. 8 shows an approach to improve the PF on the power converter that includes actively controlling the shape of the input power converter current to compensate for the capacitor currents.

FIGS. 10A-10C are example waveforms for utilizing a threshold voltage is shown in accordance with the present disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
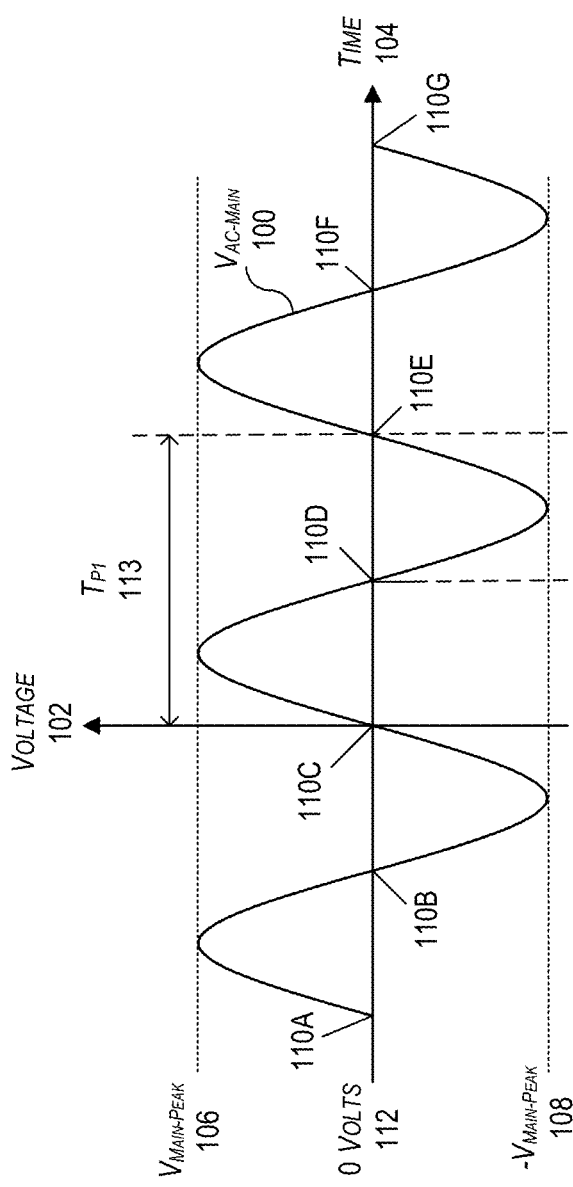
FIG. 1A is an illustration of an AC main voltage signal shown as a plot of voltage versus time.

Disclosed is a system for improving a power factor (PF) of a power converter in signal communication with a rectifier and an electromagnetic interference (EMI) capacitor ($C_{EMI}$). In this example, the rectifier is electrically connected in parallel with the EMI capacitor ($C_{EMI}$) and an input X capacitor ($C_X$) and is configured to receive an alternating current (AC) mains voltage ($V_{AC\text{-}Main}$) across the X capacitor and produce a rectified voltage across the EMI capacitor for powering an input power converter current. The AC mains input voltage $V_{AC\text{-}Main}$ has a plurality of zero-crossings at a plurality of zero-crossing times. The system includes a controller in signal communication with the power converter and a threshold detector in signal communication with the controller and power converter. The threshold detector is configured to measure and compare the rectified input voltage against a threshold voltage and the controller is configured to set the power converter to a stop-mode that stops the power converter from cycling the power switch in a regular mode of operation if the rectified input voltage is dropping in a voltage magnitude below the threshold voltage. The power converter is set to the stop-mode at a stop-time that is prior to each of the zero crossing times. The controller is further configured to set the power converter to a run-mode that enables the power converter to resume cycling the power switch transistor at a time that is after each zero-crossing time during low-load operation.

The system may further include a voltage sensor configured to sense the rectified input voltage. The threshold detector may be part of the voltage sensor. The system may further include an auto-tuner for optimizing the threshold voltage to further reduce THD. To perform this optimization, the auto-tuner may be configured to: determine a stop-current value of the rectified input current when the power converter is set to the stop-mode; determine a first time period or delay that is equal to a delay between the stop-time and the subsequent zero-crossing time; determine a second time period that is equal to a delay between when the switching power converter is set to the run-mode after the subsequent zero-crossing time and when the inrush current falls to zero following the setting of the switching power converter to the run-mode; determine an inrush current value of the rectified current when the power converter is set to the run-mode following the subsequent zero-crossing time; determine a first notch area value that is equal to the stop-current value multiplied by the first time period; determine a second notch area value that is equal to the second time period multiplied by a difference of the inrush current value and the stop-current value; and adjust the threshold voltage based on a comparison of the first notch area value and the second notch area value. The goal is to have the first notch area value equal the second notch area value. For example, suppose that the first notch area value is smaller than the second notch area value. The auto-tuner may then increase the threshold voltage to increase the first notch area value in a subsequent measurement. Alternatively, if the first notch area value is greater than the second notch area value, the auto-tuner may decrease the threshold voltage to decrease the first notch area value in a subsequent measurement. The auto-tuner may be part of the controller.

The controller, or power converter itself, may be further configured to introduce a delay, phase shift, or both to the input current for the switching power converter to improve the power factor during low load states.

In an example of operation, the system may perform a method that includes measuring and comparing the rectified input voltage against a threshold voltage and setting the power converter to a stop-mode that stops the switching power converter from switching the power switch transistor if the measured rectified voltage is dropping in a voltage magnitude below the threshold voltage, where the power converter is set to the stop-mode at a stop-time that is prior to a subsequent zero-crossing time. The method also includes setting the power converter to a run-mode that enables the power converter to resume utilizing the input power converter current at a time after the subsequent zero-crossing time.

Figure 3:
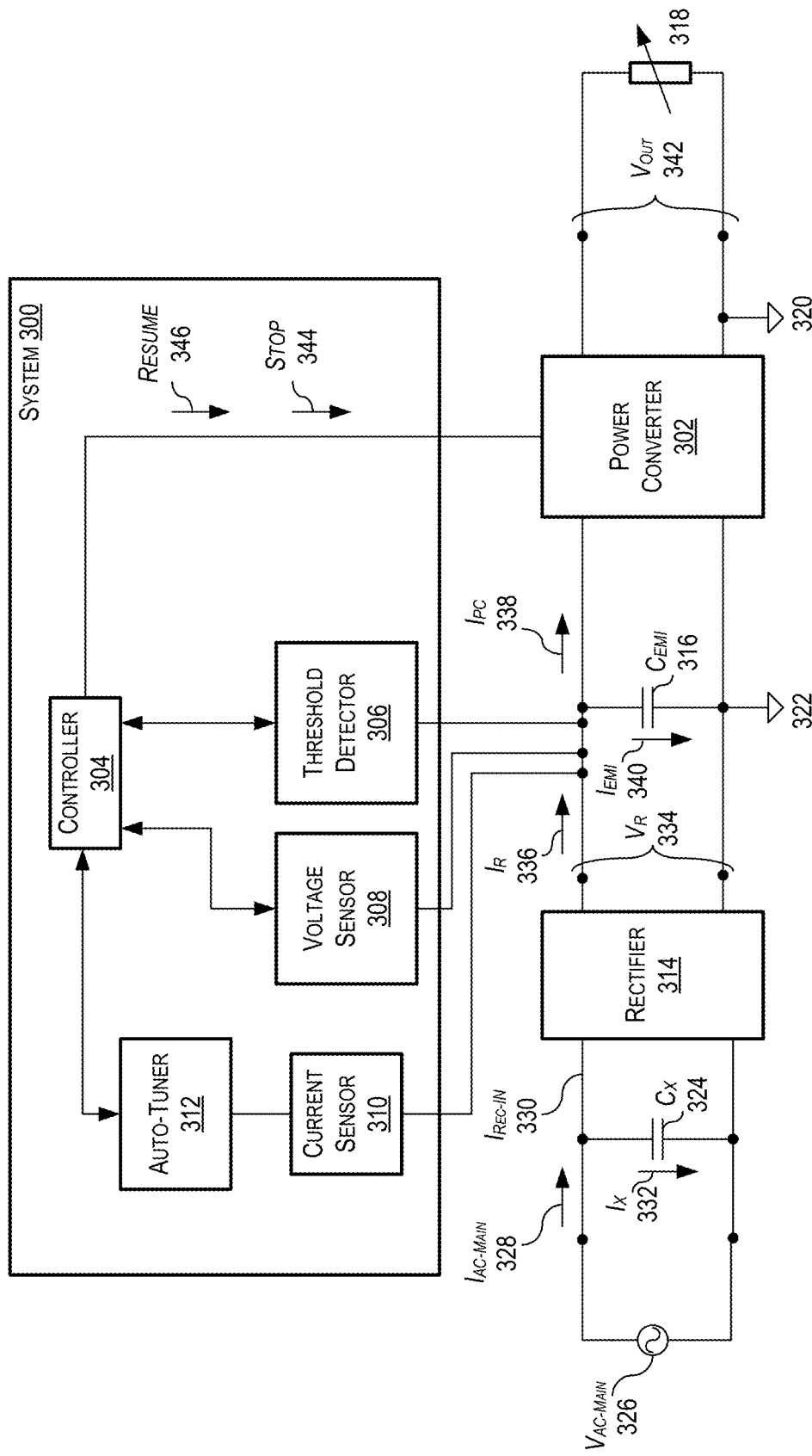
FIG. 3 is a system block diagram of an example of an implementation of a system for improving the power factor (PF) and total harmonic distortion (THD) of a power converter in accordance with the present disclosure.

Turning to FIG. 3, a system block diagram of an example of an implementation of system 300 for improving the PF while reducing the THD of a switching power converter 302 is shown in accordance with the present disclosure. As discussed earlier, in this example, the system 300 includes a controller 304, threshold detector 306, voltage sensor 308, current sensor 310, and auto-tuner 312. The controller 304 is in signal communication with power converter 302, threshold detector 306, voltage sensor 308, and auto-tuner 312. The current sensor 310 is in signal communication with the auto-tuner 312, power converter 302, and the rail for the rectified input voltage 334. The switching power converter 302 is also in signal communication with an optional output load 318, and ground connections 320 and 322. An X capacitor $C_X$ 324 is coupled across the input nodes to rectifier 314 whereas EMI capacitor 316 is coupled across the output nodes to rectifier 314. In this example, the rectifier 314 may be a diode bridge rectifier.

It is appreciated by those skilled in the art that the circuits, components, modules, and/or devices of, or associated with, the system 300 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In an example of operation, the rectifier 314 receives the AC input voltage $V_{AC\text{-}Main}$ 326 across the X capacitor $C_X$ 324. The AC mains also produces a corresponding AC mains input current ($I_{AC\text{-}Main}$) 328 that is injected into the parallel combination of the rectifier 314 and X capcitor $C_X$ 324. In general, the AC mains input current $I_{AC\text{-}Main}$ 328 is equal to the combination of a rectifier input current ($I_{Rect\text{-}in}$) 330 and an X capacitor current ($I_X$) 332, where $I_X$ 332 is either the charge or discharge current of X capacitor $C_X$ 324. In response, the rectifier 314 produces the rectified input voltage ($V_R$) 334 and a rectified input current ($I_R$) 336 that is passed to the parallel combination of the power converter 302 and the EMI capacitor $C_{EMI}$ 316. The rectified input current $I_R$ 336 is equal to the combination of an input power converter current ($I_{PC}$) 338 and an EMI capacitor current ($I_{EMI}$) 340, where $I_{EMI}$ 340 is either the charge or discharge current of EMI capacitor $C_{EMI}$ 316. The power converter 302 then produces and drives the output load 318 with an output DC voltage ($V_{Out}$) 342.

Throughout this operation, the system 300 performs a method that includes measuring and comparing the rectified input voltage 334 against a threshold voltage and setting the power converter 302 to a stop-mode that stops the power converter 302 from switching a power switch transistor in a regular mode of operation if the measured rectified input voltage 334 is dropping below the threshold voltage, where the power converter 302 is set to the stop-mode at a stop-time that is less than a subsequent zero-crossing time of the AC mains input voltage $V_{AC\text{-}Main}$ 326. In this example, the controller 304 may set the power converter 302 to the stop-mode by issuing a STOP 344 instruction to the circuitry within the power converter 302. The controller may also set the power converter to a run-mode that enables the power converter 302 to resume cycling the power switch transistor at a time that past the subsequent zero-crossing time. In general, the controller 304 may also include timing and storage circuitry that allows it to determine and/or store the timing of operation of the power converter 302 and the timing of the plurality of zero-crossing times of the plurality of zero-crossings of the $V_{AC\text{-}Main}$ 326 such that the controller 304 is configured to determine the time after the subsequent zero-crossing time. The controller 304 is capable of determining the subsequent zero-crossing time from the rectified input current $I_R$ 336 instead of the $V_{AC\text{-}Main}$ 326 because the rectified input current $I_R$ 336 tracks the $V_{AC\text{-}Main}$ 326 with twice the cycle frequency such that the rectified input voltage $I_R$ 336 will have a voltage value of approximately zero volts at the corresponding zero-crossing times of the $V_{AC\text{-}Main}$ 326. In this example, the controller 304 may set the power converter 302 to the run-mode by issuing a RESUME 346 instruction to the circuitry within the power converter 302.

In this example, the current sensor 310 is configured to sense and measure the rectified input current $I_R$ 336 and the auto-tuner 312 is configured to adjust the threshold voltage based on the measurement of the rectified input current $I_R$ 336. The auto-tuner 312 determines a stop-current value of the rectified input current $I_R$ 336 when the power converter 302 is set to the stop-mode and a first delay period that is equal to the delay between the stop-time and the subsequent zero-crossing time of the $V_{AC\text{-}Main}$ 326. The auto-tuner 312 then determines a second delay period that is equal to a time between the subsequent zero-crossing time and when the power converter 302 is set to the run-mode. In response to the setting of the run-mode, the rectified input current jumps to an inrush current value as determined by the capacitance of the EMI capacitor $C_{EMI}$ 316 and the EMI capacitor current $I_{EMI}$ 340. The auto-tuner 312 then determines the inrush current value of the rectified input current $I_R$ 336 when the power converter 302 is set to the run-mode following the subsequent zero-crossing time. The auto-tuner 312 then determines a first notch area value that is equal to the stop-current value multiplied by the first delay period and a second notch area value that is equal to the second delay period multiplied by a difference of the inrush current value and the stop-current value. The auto-tuner 312 then adjusts the threshold voltage based on a comparison of the first notch area value and the second notch area value. In this example, the first notch area and second notch area are distortions on the various current waveforms (such as $I_{AC\text{-}Main}$ 328 and $I_R$ 336) caused by the charging and discharging of the capacitors $C_X$ 324 and $C_{EMI}$ 316 at the zero-crossings.

Figure 1B:
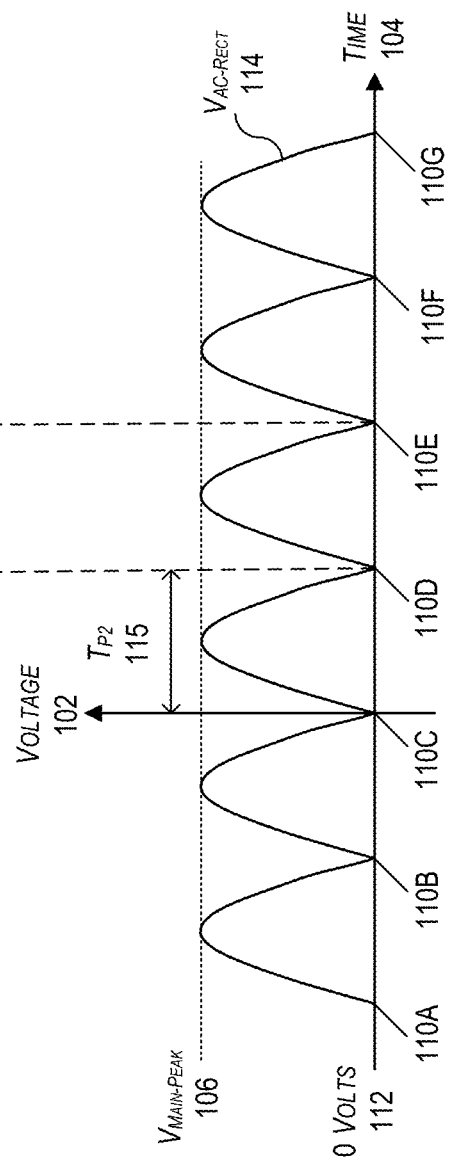
FIG. 1B is an illustration of a rectified AC main voltage signal as a plot of the voltage versus time.
Figure 2:
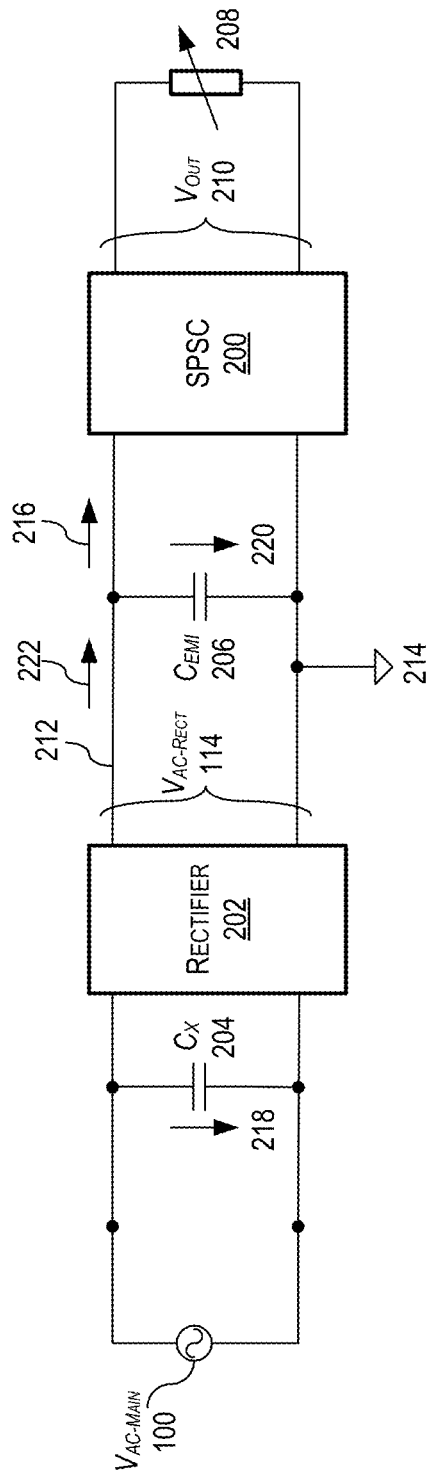
FIG. 2 is a system block diagram of an example of a single-stage AC-DC power switching converter connected to the AC main voltage signal through a rectifier.
Figure 4:
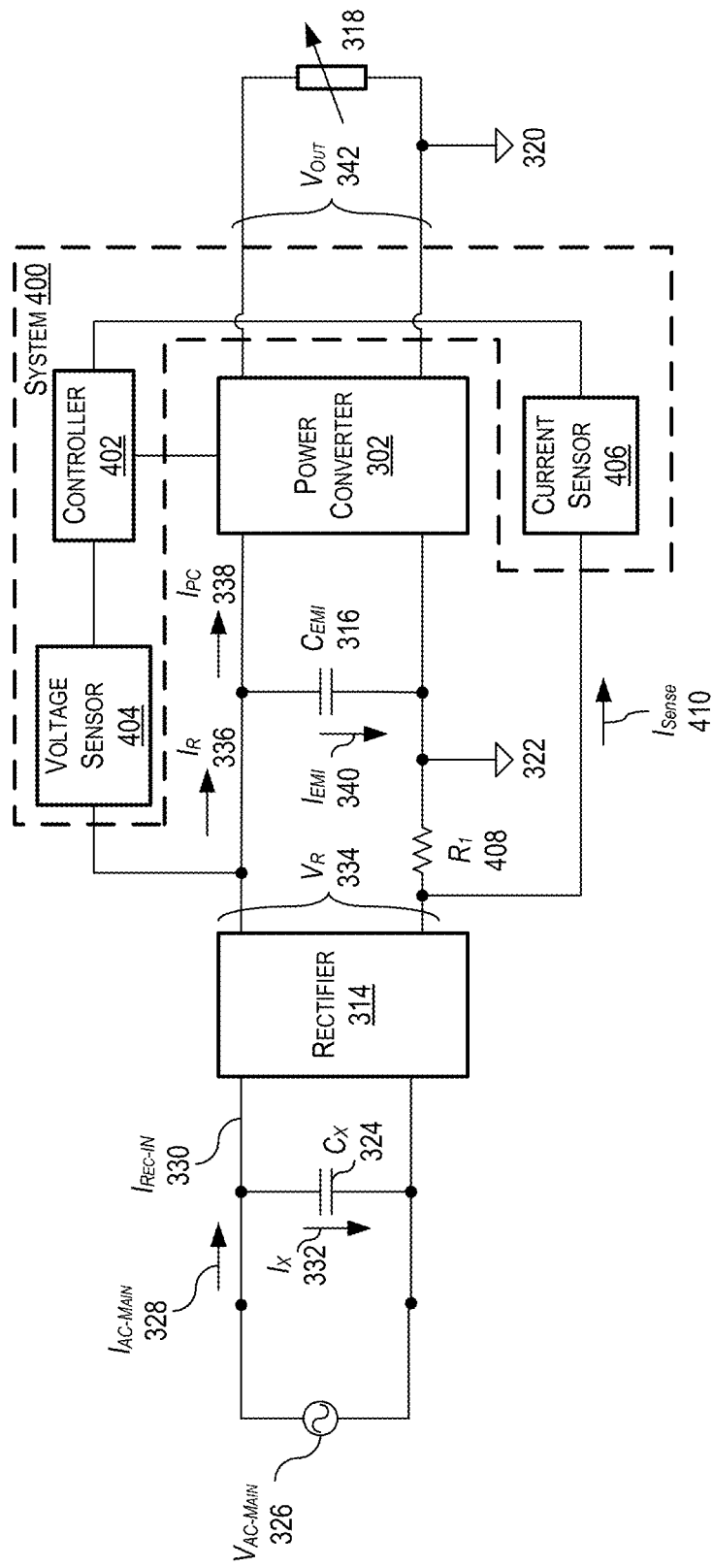
FIG. 4 is a system block diagram of an example of another implementation of a system for improving the PF and THD of a power converter in accordance with the present disclosure.

In FIG. 4, a system block diagram of an example of another implementation of a system 400 for improving the PF of the power converter 302 while reducing the THD is shown in accordance with the present disclosure. In this example, the System 400 includes a controller 402, voltage sensor 404, and current sensor 406 as discussed analogously with regard to FIG. 1. The current sensor 406 is also in signal communication with rectifier 314 and a current sense resistor ($R_I$) 408. The current sense resistor $R_I$ 408 is in signal communication with the rectifier 314 and ground 322 and allows current to produce a voltage drop across the current sense resistor $R_I$ 408 that is proportional to the rectified input current 336. In an example, the current sense resistor $R_I$ 408 may be an implementation of the current sensor 406. The voltage sensor 404 is configured to measure the rectified input voltage $V_R$ 334 and may include a threshold detector. In this example, the controller 402 may include an auto-tuner.

Figure 5A:
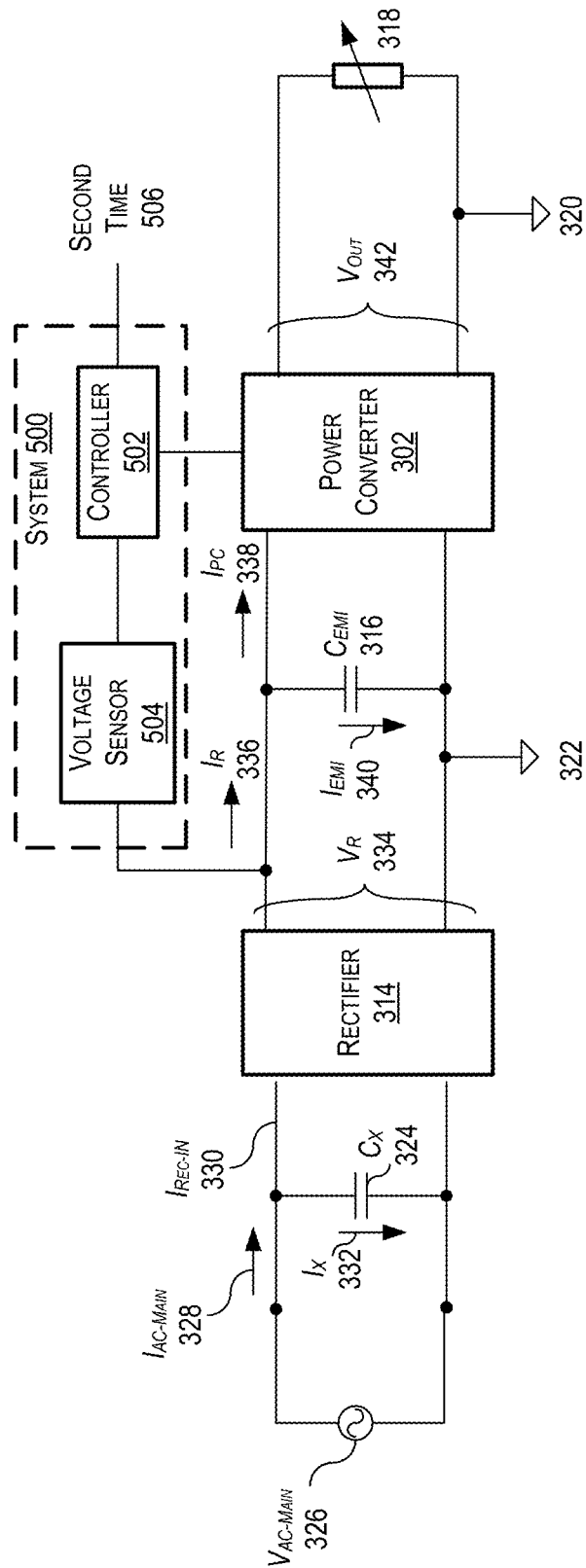
FIG. 5A is a system block diagram of an example of yet another implementation of a system for improving the PF and THD of the power converter in accordance with the present disclosure.

In FIG. 5A, a system block diagram of an example of yet another implementation of a system 500 for improving the PF of the power converter 302 while reducing the THD is shown in accordance with the present disclosure. In this example, the system 500 includes a controller 502 and voltage sensor 504. The controller 502 is in signal communication with the power converter 302 and voltage sensor 504. In this example, the controller 502 may include an auto-tuner and is configured to determine a stop-current value of the rectified input current $I_R$ 336 when the power converter 302 is set to the stop-mode and to determine a first delay period that is equal to a time between the stop-time and the subsequent zero-crossing time of the $V_{AC\text{-}Main}$ 326. The controller 502 then either receives or has in storage a predetermined value 506 for the second delay period and determines the inrush current value of the rectified input current $I_R$ 336 when the power converter 302 is set to the run-mode at the expiration of the second delay period. The controller 502 then determines a first notch area value that is equal to the stop-current value multiplied by the first delay period and a second notch area value that is equal to the second delay period multiplied by a difference of the inrush current value and the stop-current value. The controller 502 then adjusts the threshold voltage based on a comparison of the first notch area value and the second notch area value.

Figure 5B:
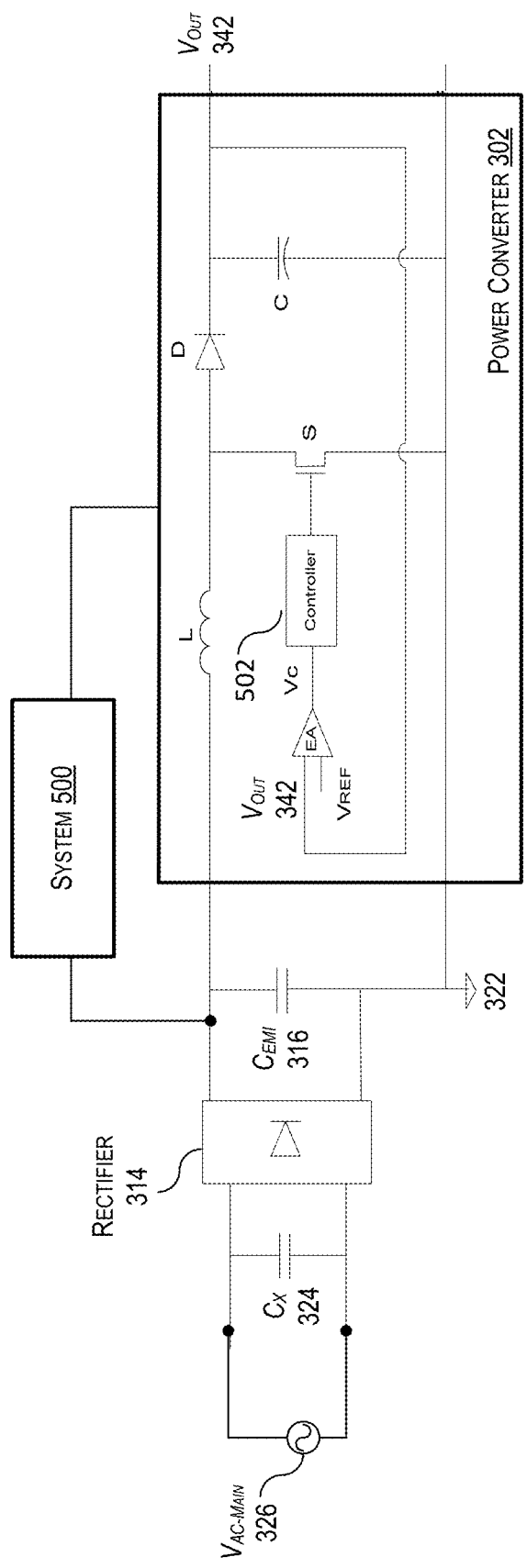
FIG. 5B illustrates an embodiment of the system of FIG. 5A in which the switching power converter is a boost converter.

The switching power converter 302 may comprise any suitable switching power converter such as a flyback converter, a buck converter, a boost converter, or a buck/boost converter. For example, FIG. 5B illustrates an embodiment in which system 500 controls the power switch cycling of a power switch transistor S for a boost converter 302. For illustration clarity, controller 502 is shown separately from system 500 in FIG. 5B. As known in the switching power converter arts, an error amplifier (EA) generates a control voltage Vc responsive to a difference between the output voltage 342 and a reference voltage. During the regular mode of operation, controller 502 controls the cycling of the power switch transistor S responsive to the control voltage. In addition, controller 502 controls the cycling of the power switch transistor S during the regular mode of operation responsive to a delayed and phase-shifted version of the rectified input voltage for improved power factor correction during low-load states.

Figure 6A:
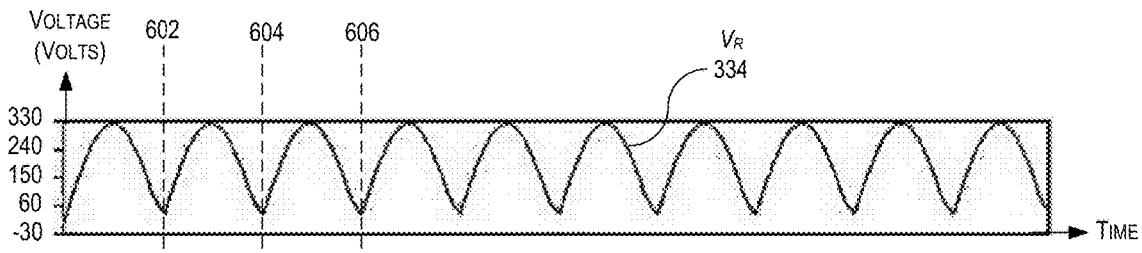
FIG. 6A is a plot of a rectified voltage as voltage versus time in accordance the present disclosure.
Figure 6B:
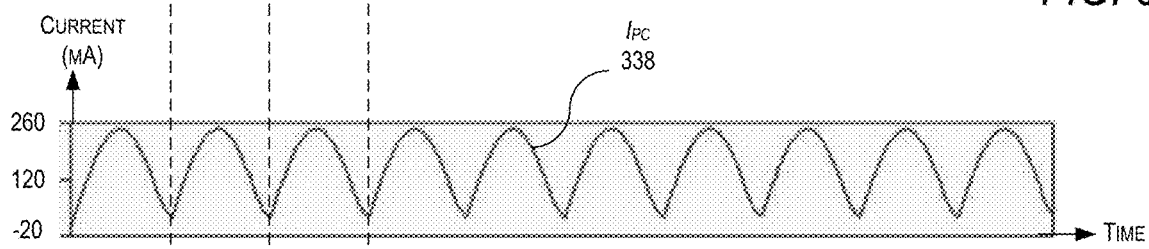
FIG. 6B is a plot of the input power converter current as current versus time is shown in accordance the present disclosure.

To provide improved power factor correction as known in the switching power converter arts, controllers 304, 402, or 502 compensates for input current distortion from the X capacitor 324 and the EMI capacitor 316 during periods of low load. During low load, the input current 338 drawn by the switching power converter is relatively small. The current 340 conducted by the EMI capacitor 316 thus becomes an appreciable portion of the rectified input current 336 from the rectifier during low load conditions. In contrast, the EMI current 340 is a relatively minor portion of the rectified input current 336 during heavy load conditions since the input current 338 drawn by the switching power converter becomes relatively large during high load conditions. The EMI capacitor current 340 thus raises a need for power factor compensation during low load states as compared to simply shaping the switching power converter input current 338 to match the waveform for the rectified input voltage 334. A better appreciation of this need for power factor compensation may be provided by a consideration of FIGS. 6A-6E, which illustrate several different signal waveforms that would be produced by system 300 (or system 400 or system 500) if system 300 did not compensate for the EMI capacitor currents. In particular, FIG. 6A shows several cycles of the rectified input voltage $V_R$ 334 without compensation for the EMI capacitor currents. FIG. 6B is a plot of the switching power converter input current $I_{PC}$ 338 in the same time frame shown in FIG. 6A. Since there is no compensation for the EMI capacitor currents, note that the switching power converter input current 338 is in phase with the rectified input voltage 334. During periods of high load, such phasing of the input current 338 with the rectified input voltage 334 for the switching power converter would provide an excellent power factor.

Figure 6C:
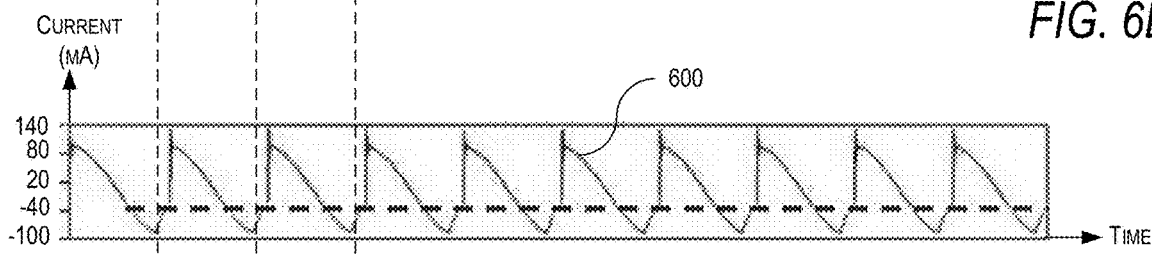
FIG. 6C is a plot of the combined current of both capacitors input capacitor and electromagnetic interference capacitor as current versus time in accordance the present disclosure.
Figure 6D:
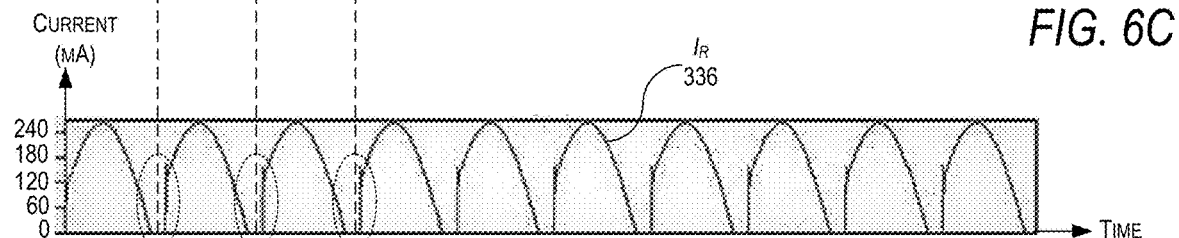
FIG. 6D is a plot of the rectified current as current versus time is shown in accordance the present disclosure.
Figure 6E:
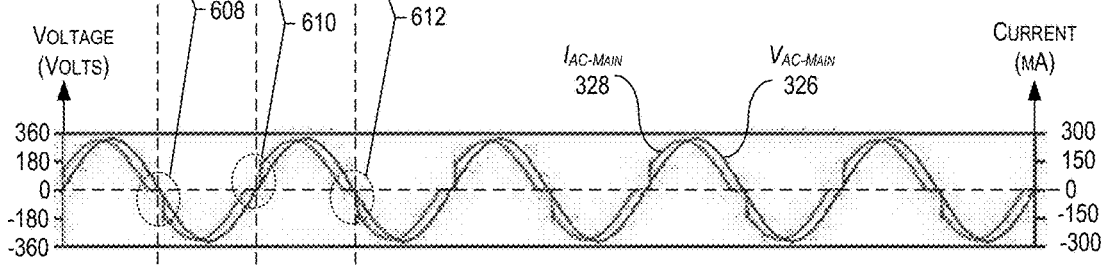
FIG. 6E is a first plot of the AC main voltage signal as voltage versus time and a second plot of the AC mains input current as current versus time are shown in accordance the present disclosure.

But note the corresponding EMI capacitor current 600 (a sum of both $I_X$ 332 and Inc 340) as shown in FIG. 6C during the same time frame. The EMI current 600 is appreciable compared to the switching power converter input current 338. Because of this appreciable EMI current contribution, the rectified input current 336 as shown in FIG. 6D is distorted with respect to the rectified input voltage 334, which lowers the power factor. Not only is the power factor lowered by this EMI current distortion, but total harmonic distortion is also elevated as shown In FIG. 6E, which shows the $V_{AC-Main}$ 326 and the $I_{AC-Main}$ 328 (i.e., milliamps) over the same timeframe.

From these plots, it is shown that all the signal waveforms of $V_{AC-Main}$ 326, $I_{AC-Main}$ 328, $I_R$ 336, combined current 600, $I_{PC}$ 338, and $V_R$ 334 are aligned along the zero-crossings of the $V_{AC-Main}$ 326. In this example, the first zero-crossing time 602, second zero-crossing time 604, and third zero-crossing time 606 are shown for illustrative purposes. Moreover, from these plots, it is evident that that the zero-crossings cause the capacitors $C_X$ 324 and $C_{EMI}$ 316 to charge and discharge causing notches 608, 610, and 612 to appear on the $I_{AC-Main}$ 328 and $I_R$ 336 signal waveforms, where the notches straddle the corresponding zero-crossing times 602, 604, and 606.

FIGS. 7 and 8 show a conventional approach to improve the PF that includes actively controlling the shape of $I_{PC}$ 338 to compensate for the capacitor currents $I_X$ 332 and $I_{EMI}$ 340. Instead of the $I_{PC}$ 338 perfectly following the shape of the rectified input voltage 334 as shown in FIG. 7, a compensation to $I_{PC}$ 338 adds a phase shift as well as a delay at the start of each cycle of the rectified input voltage 334 as shown in FIG. 8. In other words, a conventional controller shapes the input current 338 to the switching power converter responsive to a delayed and phase-shifted version of the rectified input voltage 334. As shown the FIG. 8, the resulting rectified input current $I_R$ 336 is now more in phase with the $V_{AC-Main}$ 326 waveform so as to significantly improve the power factor during low load operation (e.g., 25% of maximum load). However, note that the input current 338 to the switching power converter just prior to the zero crossing is elevated due to this compensation as compared to its uncompensated value in FIG. 7. Both the compensated AC mains input current 328 in FIG. 8 and the uncompensated AC mains input current 328 in FIG. 7 have comparable deviations or notches with respect to the desired sinusoidal profile adjacent to the zero-crossing times. The conventional compensation as shown in FIG. 8 improves the power factor but still suffers from substantial THD.

In order to have a sufficiently high PF and reduced THD, the system and method described herein utilizes the switching on and off of the $I_{PC}$ 338 and optionally the auto-tuning so as to reduce the notches caused by the rapid changing and discharging of $C_X$ 324 and $C_{EMI}$ 316. The input current 338 thus has a delayed and phase-shifted profile. But in each cycle of the rectified input voltage 334, the input current 338 is substantially terminated prior to the zero-crossing time at the completion of the cycle of the rectified input voltage 334 when the rectified input voltage has fallen below the threshold voltage. There is a first delay period between the termination of the input current 338 to the zero-crossing time at the completion of the cycle of the rectified input voltage 334.

Figure 9A:
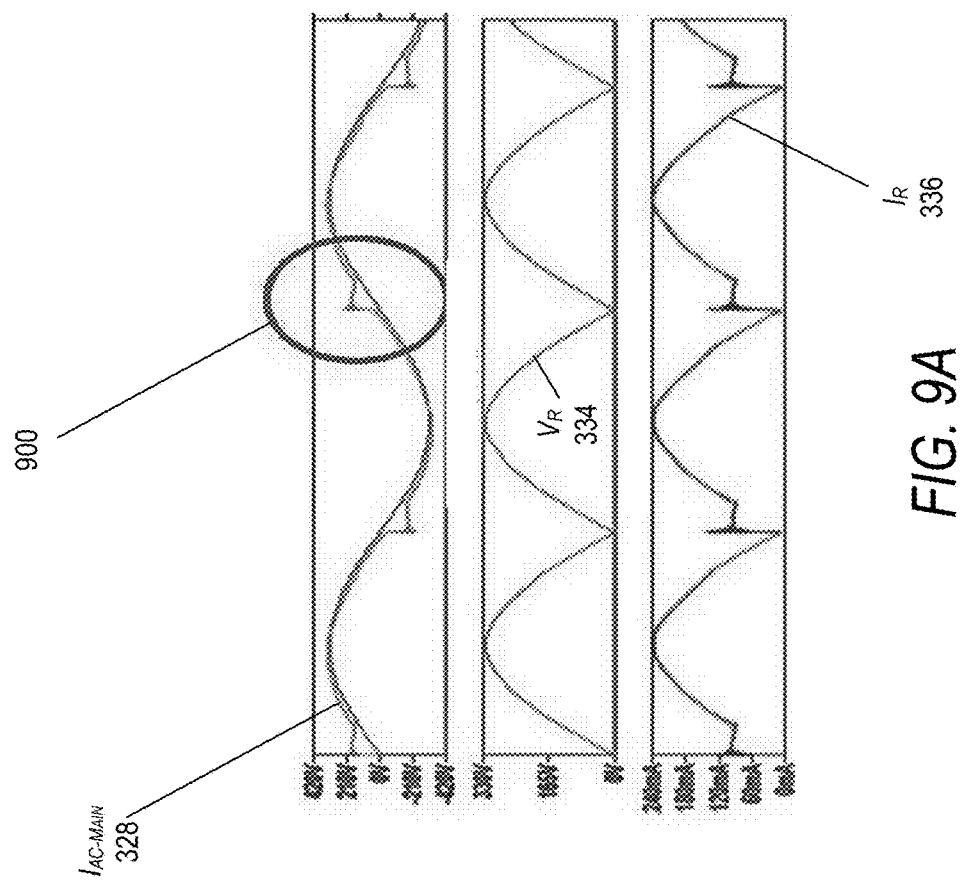
FIGS. 9A and 9B show a comparison of just compensating for PF versus compensating for PF and also actively stopping the input power converter current prior to a zero-crossing of the AC main voltage signal.
Figure 9B:
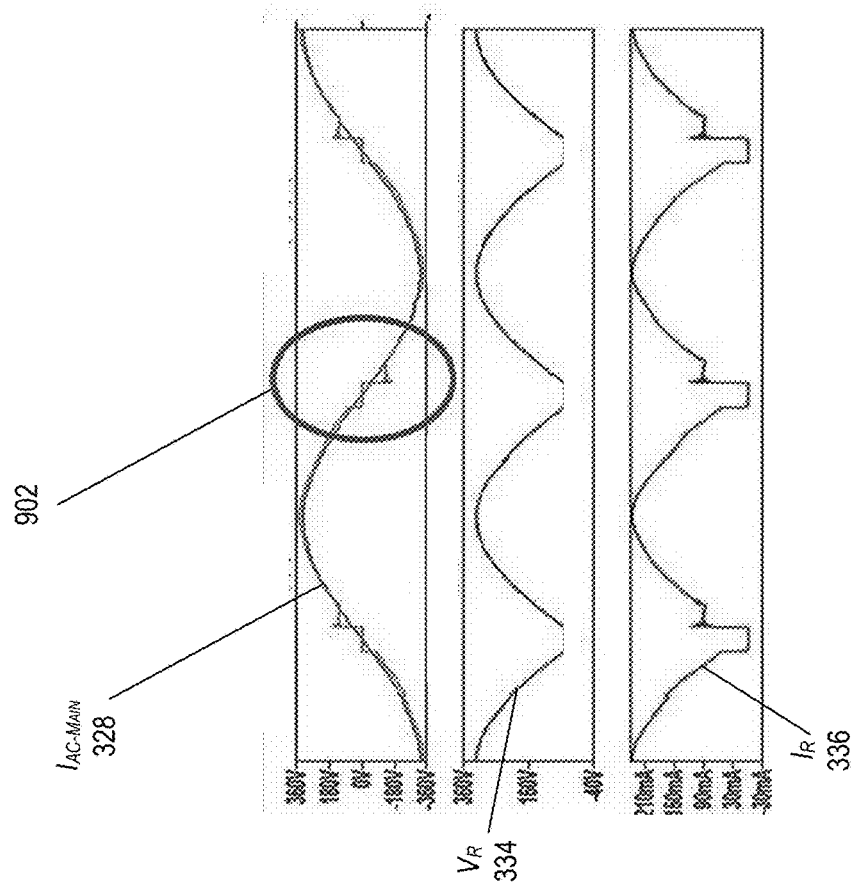

In general, by substantially terminating the $I_{PC}$ 338 prior to a zero-crossing of the $V_{AC-Main}$ 326 in response to the rectified input voltage 334 dropping below (or dropping to) the threshold voltage, the EMI capacitors $C_X$ 324 and $C_{EMI}$ 316 are not fully discharged. This greatly reduces the inrush current severity and reduces THD. To show this improvement, consider FIGS. 9A and 9B. FIG. 9A illustrates the rectified input voltage 334 waveform over a timeframe of several cycles. The input current to the switching power converter is conventionally compensated as discussed with regard to FIG. 8 to provide the resulting rectified input current 336 of FIG. 9A. The AC mains current 328 has a substantial notch or deviation for its sinusoidal profile as highlighted by circle 900 from the EMI capacitor current distortion as compared to the sinusoidal AC mains voltage. This notch causes substantial THD. But the waveforms in FIG. 9B show the improvement from the termination of the switching power converter input current 338 prior to the zero crossings due to the rectified input voltage 334 dropping to the threshold voltage prior to the end of each cycle of the rectified input voltage 334. In particular, note that the rectified input voltage 334 now has a constant voltage period in the vicinity of each zero crossing from the cessation of the $I_{PC}$ 338. The rectified input current 336 has a similar constant current period (in this case, of approximately no current) at each zero crossing due to the cessation of the $I_{PC}$ 338 prior to each zero crossing. The result is that the notch in the AC mains input current 328 discussed with regard to FIG. 9A is bifurcated into two smaller notches in FIG. 9B as highlighted by circle 902. A first smaller notch occurs before each zero crossing followed by a second smaller notch after each zero crossing. The termination of $I_{PC}$ 338 prior to the zero crossings has thus reduced the THD.

Although a fixed voltage threshold may be used in some embodiments such that no tuning of the threshold voltage would be used, it is beneficial to tune the threshold voltage as follows. Turning to FIGS. 10A-10C, an example of utilizing a threshold voltage 1000 for the termination of $I_{PC}$ 338 prior to the zero crossings is shown in accordance with the present disclosure. The system utilizes the threshold voltage 1000 to determine the time at which the power converter 302 switching should be terminated just prior to the $V_{AC\text{-}Main}$ 326 zero-crossing (602, 604, or 606). By utilizing this approach, instead of one large single notch, a stair-step notch results as discussed for FIG. 9B. In FIG. 10A, the rectified input voltage $V_R$ 334 waveform is shown with constant-voltage portions corresponding to the zero-crossings 602, 604, and 606 of the $V_{AC\text{-}Main}$ 326. At a point 1002 where the $V_R$ 334 drops to the threshold voltage 1000, a control signal 1004 (i.e., 344) from the controller 304 turns off the input current to the switching power converter $I_{PC}$ 338 by setting the power converter 302 to the stop-mode to stop the cycling of the power switch transistor. This happens at a stop-time ($T_{Stop}$) 1006 that is less than a zero-crossing time ($T_{Zero\text{-}crossing}$) 1008. At point 1002, the rectified input current $I_R$ 336 is equal to a stop-current value ($I_{Stop}$) 1010. At a time $T_{begin}$ after the $T_{Zero\text{-}crossing}$ 1008, the controller 304 begins conducting the $I_{PC}$ 338 by setting the power converter 302 to run-mode to begin cycling the power switch transistor. Note that time $T_{begin}$ is part of the conventional EMI current compensation discussed with regard to FIG. 8. Since this this delay $Tb_{egin}$ and phase-shifting of the waveform for the input current 338 to the switching power converter is conventional, the generation of the delay $T_{begin}$ and the phase-shifting to shape the input current to the switching power converter will not be discussed in detail herein. At time $T_{begin}$ following the zero crossing 602, the rectified input current $I_R$ 336 increases rapidly because of the inrush current from the X capacitor $C_X$ 324 and/or the EMI capacitor $C_{EMI}$ 316 to a maximum inrush current value ($I_{Inrush}$) 1012.

There is a delay $T_1$ from the threshold crossing 1002 to the zero crossing 602 due to the termination of the input current for the switching power converter. Similarly, there is a second time period $T_2$ from time $T_{begin}$ to when the inrush current disturbance for the rectified input current 336 has subsided. From these values, the controller 304 determines a first notch area value that is equal to the $I_{Stop}$ 1010 multiplied by $T_1$ and a second notch area value that is equal to the $T_2$ multiplied by a difference of the $I_{Inrush}$ 1012 and the $I_{Stop}$ 1010. Once the first notch area value and second notch area value are determined, the controller 304 may adjust the threshold value based on the comparison of the first notch area value and the second notch area value.

Figure 11:
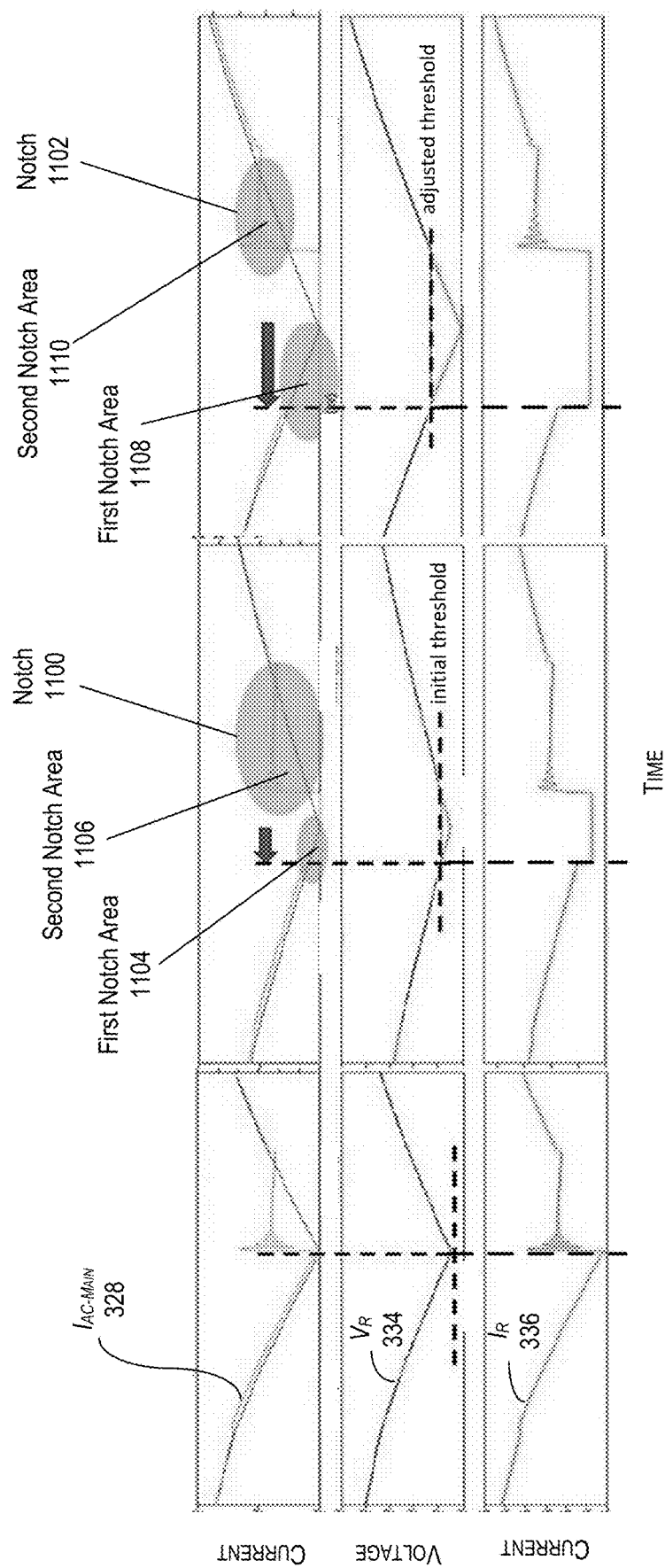
FIG. 11 is an expanded view of the plots of AC mains input current, rectified voltage, and rectified current with the notches shown on the plot of the AC mains input current.

In FIG. 11, an expanded view of the plots of $I_{AC\text{-}Main}$ 328, rectified input voltage $V_R$ 334, and rectified input current $I_R$ 336 are shown with the notches shown on the plot of the $I_{AC\text{-}Main}$ 328. During an initial zero crossing, no threshold voltage is applied to the rectified input voltage 334. In a second zero crossing, a relatively-low threshold voltage is applied to the rectified input voltage 334. In response, a first notch area value 1104 is smaller than a second notch area value 1106. In order to improve the PF and THD, the initial threshold value may be increased to an adjusted threshold value for a third zero crossing to better distribute energy between the notch areas. As an example, by properly adjusting the adjusted threshold value, the distribution of energy is improved by increasing a first notch area 1108 and decreasing a second notch area 1110.

Figure 12:
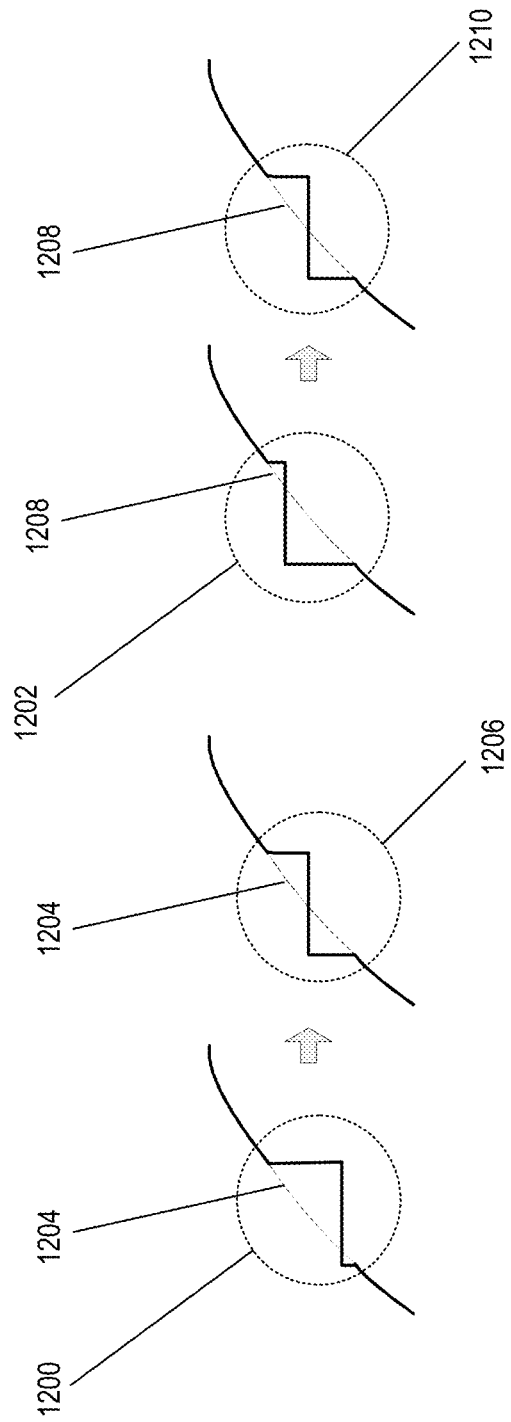
FIGS. 12A and 12B are illustrations of an example of an implementation for the movement of two example notches in accordance with the present disclosure.

In FIGS. 12A and 12B, an illustration of an example of an implementation for the movement of two example notches 1200 and 1202 are shown in accordance with the present disclosure. In this example, the threshold value is adjusted to move the first notch 1200 from a first position that straddles the envelope 1204 of the $I_{AC\text{-}Main}$ 328 that is not symmetrical to a better position 1206 that is more symmetrical. Similarly, the threshold value is also adjusted to move the second notch 1202 from a first position that straddles the envelope 1208 of the $I_{AC\text{-}Main}$ 328 that is not symmetrical to a better position 1210 that is more symmetrical.

Figure 13:
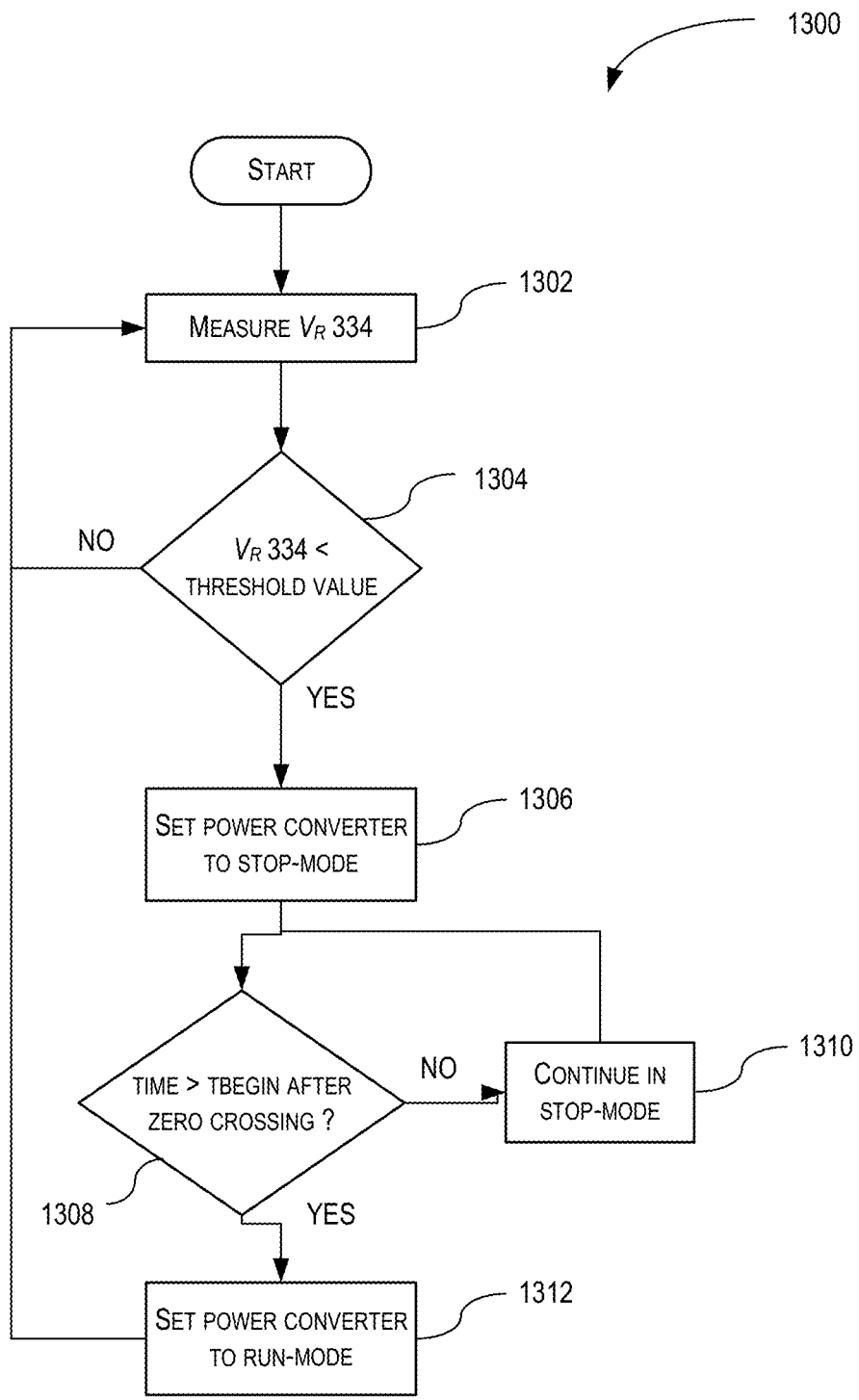
FIG. 13 is a flowchart is shown of an example of an implementation of method performed by the system in accordance with the present disclosure.

Turning to FIG. 13, a flowchart is shown of an example of an implementation of method 1300 performed by the system 300, 400, or 500 in accordance with the present disclosure. The method 1300 includes measuring or sensing 1302 the rectified input voltage $V_R$ 334 and comparing 1304 the sensed value of $V_R$ 334 against a threshold voltage. If the sensed value of $V_R$ 334 is greater than the threshold voltage, the method 1300 continues to measure 1302 the $V_R$ 334 and the measured value is again compared 1304 against the threshold voltage.

If, instead, the $V_R$ 334 has fallen from a peak value to less than or equal to the threshold voltage, the controller 304 sets 1306 the power converter 302 to the stop-mode in which the power converter 302 stops cycling the power switch. The method 1300 then determines 1308 if the time is greater than the $T_{begin}$ time following the zero-crossing time. If the time is not greater than the zero-crossing time, the controller 304 maintains the power converter 302 in the stop-mode and repeats step 1308.

If, instead, the delay past the zero-crossing time equals the desired value $T_2$ for compensation, the controller 304 sets the power converter 302 to a run-mode and the power converter 302 resumes utilizing the $I_{PC}$ 338 and the method 1300 repeats at step 1302.

Referring again to system 500, note that is conventional for a switching power converter to be able to measure the input current to the switching power converter. For example, the power switch transistor 51 is typically in series with a sense resistor (not illustrated) so that controller 502 may measure the peak current through the power switch transistor 51 and thus estimate the input current. The rectified input current also depends upon the EMI capacitor current. Similarly, the AC mains input current depends upon the EMI capacitor current and the X capacitor current. But those currents can be estimated based upon the capacitances of the corresponding capacitors. Controller 502 may thus be configured with a memory (not illustrated) that would store the estimate of the capacitor currents. In this fashion, controller 502 may estimate the rectified input current from just measuring the input current to the switching power converter.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

Furthermore, as those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A system for a switching power converter including a rectifier for rectifying an AC mains voltage into a rectified input voltage, wherein the AC mains voltage has a plurality of half cycles and the rectified input voltage has a cycle for each half cycle of the AC mains voltage, the system comprising:
a controller; and
a threshold detector configured compare the rectified input voltage to a threshold voltage to determine when the rectified input voltage is less than the threshold voltage,
wherein for each cycle of the rectified input voltage, the controller is configured to cycle a power switch during a regular mode of operation after an expiration of a first delay from a beginning of the cycle of the rectified input voltage until a determination by the threshold detector that the rectified input voltage has dropped from a peak to the threshold voltage at a stop time, the controller being further configured to prevent the power switch from cycling from the beginning of the cycle of the rectified input voltage until the expiration of the first delay and from the stop time until an end of the cycle of the rectified input voltage, wherein a peak current for each cycle of the power switch during the regular mode of operation is responsive to a phase-shifted version of the rectified input voltage that is delayed by the first delay.

2. The system of claim 1, further including a voltage sensor configured to sense the rectified input voltage.

3. The system of claim 2, further including
an auto-tuner; and
a current sensor configured to sense a rectified input current produced by the rectifier; and
wherein the auto-tuner is configured to adjust the threshold voltage based on a measurement of the rectified input current.

4. The system of claim 3, wherein the threshold detector is part of the voltage sensor.

5. The system of claim 4, wherein the current sensor includes a sensing resistor in signal communication with the rectifier and a ground.

6. The system of claim 3, wherein for each cycle of the rectified input voltage, the auto-tuner is configured to:
determine a stop-current value of the rectified input current at the stop time;
determine a first time period that is equal to a delay between the stop time and an end of the cycle;
determine an inrush current value of the rectified input current at an expiration of the first delay;
determine a first product of the stop-current value multiplied by the first time period;
determine a second product of the first delay multiplied by a difference of the inrush current value and the stop-current value, and
adjust the threshold voltage based on a comparison of the first product and the second product.

7. The system of claim 6, wherein the inrush current value is fixed by a capacitance value of an EMI capacitor.

8. The system of claim 6, wherein the switching power converter is a boost converter.

9. The system of claim 3, wherein for each cycle of the rectified input voltage, the auto-tuner is configured to:
determine a stop-current value of the rectified input current at the stop time;
determine a first time period that is equal to a delay between the stop time and an end of the cycle of the rectified input voltage;
determine a first notch area value that is equal to the stop-current value multiplied by the first time period; and
adjust the threshold voltage based on a comparison of the first notch area value and a predetermined second value.

10. The system of claim 9, wherein the auto-tuner is part of the controller.

11. The system of claim 9, wherein the predetermined second value is fixed by a capacitance value of an EMI capacitor.

12. The system of claim 1, wherein the controller is further configured to set the threshold voltage responsive to a fuse memory.

13. The system of claim 1, wherein the controller is further configured to set the threshold voltage responsive to a resistance of an external resistor.

14. A method for a switching power converter including a rectifier for rectifying an AC mains voltage into a rectified input voltage, wherein the AC mains voltage has a plurality of half cycles and the rectified input voltage has a cycle for each half cycle of the AC mains voltage, the method comprising:
for each cycle of the rectified input voltage:
cycling a power switch transistor in a regular mode of operation after a first delay from a beginning of the cycle of the rectified input voltage, the power switch transistor not being cycled from the beginning of the cycle of the rectified input voltage until an expiration of the first delay;
comparing the rectified input voltage against a threshold voltage during the regular mode of operation; and
setting the power converter to a stop-mode that stops the power converter from cycling the power switch transistor in the regular mode of operation from a stop time when the rectified input voltage has dropped from a peak during the cycle of the rectified input voltage to the threshold voltage, the power switch transistor remaining off from the stop time to an end of the cycle of the rectified input voltage, wherein a peak input current to the switching power converter for each cycle of the power switch transistor during the regular mode of operation is responsive to a delayed and phase-shifted version of the rectified input voltage that is delayed by the first delay.

15. The method of claim 14, further including
sensing and measuring a rectified input current produced by the rectifier; and
adjusting the threshold voltage based on the measurement of the rectified current.

16. The method of claim 15, wherein adjusting the threshold voltage based on the measurement of the rectified current includes
- determining a stop-current value of the rectified input current when the power converter is set to the stop-mode;
- determining a first time period that is equal to a time between the stop-time and an end of the cycle;
- determining an inrush current value of the rectified input current at an expiration of the first delay;
- determining a first notch area value that is equal to the stop-current value multiplied by the first time period;
- determining a second notch area value that is equal to the first delay multiplied by a difference of the inrush current value and the stop-current value, and
- adjusting the threshold voltage based on a comparison of the first notch area value and the second notch area value.

17. The method of claim 16, wherein the inrush current value is determined by a capacitance value of the EMI capacitor.

18. The method of claim 16, wherein adjusting the threshold voltage based on the measurement of the rectified current includes
- determining a stop-current value of the rectified input current when the power converter is set to the stop-mode;
- determining a first time period that is equal to a time between the stop-time and an end of the cycle of the rectified input voltage;
- determining an inrush current value of the rectified input current at an expiration of the first delay;
- determining a first notch area value that is equal to the stop-current value multiplied by the first time,
- determining a second notch area value that is equal to a predetermined second time period multiplied by a difference of the inrush current value and stop-current value, and
- adjusting the threshold voltage based on a comparison of the first notch area value and the second notch area value.

19. The method of claim 14, further comprising:
- reading a value of the threshold voltage from a one-time-programmable memory.

20. The method of claim 19, further comprising:
- programming the one-time-programmable memory with the value of the threshold voltage.

\* \* \* \* \*

UNITED STATES PATENT AND TRADEMARK OFFICE
CERTIFICATE OF CORRECTION

PATENT NO. : 10,848,056 B1
APPLICATION NO. : 16/544789
DATED : November 24, 2020
INVENTOR(S) : Xu et al.

Page 1 of 1

It is certified that error appears in the above-identified patent and that said Letters Patent is hereby corrected as shown below:

In the Specification

In Column 2, Line 4, change "(Inc) 216" to -- ($I_{PC}$) 216 --

In Column 8, Line 24, change "(RI) 408" to -- ($R_1$) 408 --

In Column 8, Line 24, change "RI 408" to -- $R_1$ 408 --

In Column 8, Line 27, change "RI 408" to -- $R_1$ 408 --

In Column 8, Line 28, change "RI 408" to -- $R_1$ 408 --

In Column 9, Line 45, change "Inc 340" to -- $I_{EMI}$ 340 --

In Column 12, Line 42, change "51" to -- S1 --

In Column 12, Line 45, change "51" to -- S1 --

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*